US012724266B2

(12) United States Patent
Macken et al.

(10) Patent No.: US 12,724,266 B2
(45) Date of Patent: Sep. 1, 2026

(54) WAVEGUIDE DISPLAY SYSTEMS

(71) Applicant: BAE SYSTEMS plc, London (GB)

(72) Inventors: Ian Thomas Macken; Rory Thomas Alexander Mills, Rochester (GB); Paul Stewart Morant, Rochester (GB); Christopher Coote, Rochester (GB)

(73) Assignee: BAE SYSTEMS PLC, London (GB)

( * ) Notice: Subject to any disclaimer, the term of this patent is extended or adjusted under 35 U.S.C. 154(b) by 202 days.

(21) Appl. No.: 18/839,230

(22) PCT Filed: Feb. 15, 2023

(86) PCT No.: PCT/GB2023/050345
§ 371 (c)(1),
(2) Date: Aug. 16, 2024

(87) PCT Pub. No.: WO2023/161606
PCT Pub. Date: Aug. 31, 2023

(65) Prior Publication Data
US 2025/0180902 A1 Jun. 5, 2025

(30) Foreign Application Priority Data
Feb. 22, 2022 (EP) .................................... 22275017
Feb. 22, 2022 (GB) .................................... 2202394

(51) Int. Cl.
*G02B 27/01* (2006.01)

(52) U.S. Cl.
CPC ....... *G02B 27/017* (2013.01); *G02B 27/0172* (2013.01); *G02B 27/0101* (2013.01)

(58) Field of Classification Search
CPC .............. G02B 27/017; G02B 27/0172; G02B 2027/0174; G02B 2027/0178;
(Continued)

(56) References Cited

U.S. PATENT DOCUMENTS 10,425,636 B2 * 9/2019 Bohn ................. G02B 27/0172
10,606,079 B1 3/2020 Keith
(Continued)

FOREIGN PATENT DOCUMENTS

CN 110660036 A 1/2020
WO 2020191170 A1 9/2020
WO 2023161606 A1 8/2023

OTHER PUBLICATIONS

International Search Report and Written Opinion received for PCT/GB2023/050345, mailed Apr. 19, 2023. 9 pages.
(Continued)

*Primary Examiner* — Bao-Luan Q Le
(74) *Attorney, Agent, or Firm* — Arcane Law PLLC

(57) ABSTRACT

A system for delivering an image to a user via a waveguide display system and for determining integrity of an image, the system comprising a waveguide assembly including: an in coupling element configured to receive a collimated image from a imaging system and an out coupling element configured to direct the collimated image toward an eye of a user, wherein the waveguide is configured to direct at least a first portion of the collimated image from the in coupling element to the out coupling element to be directed to the user; wherein prior to the collimated image being directed towards the eye a second portion of the collimated image is configured to be directed towards an integrity monitoring module which determines at least one discrepancy between the collimated image and the image to thereby correct the first portion of the collimated image.

20 Claims, 11 Drawing Sheets

(58) Field of Classification Search
CPC .............. G02B 27/0101; G02B 27/108; G02B 2027/0138; G02B 2027/011
See application file for complete search history.

(56) References Cited

U.S. PATENT DOCUMENTS 11,175,457 B1 * 11/2021 Trail ...................... G02B 6/122
11,202,043 B1 * 12/2021 Elazhary ............ G02B 27/0176
11,624,926 B1 * 4/2023 Lam ................... G02B 27/0101 345/8
11,722,654 B1 * 8/2023 Sutton .................. H04N 13/327 348/177
11,876,952 B2 * 1/2024 Churin ................. H04N 13/398
12,085,724 B1 * 9/2024 DeLapp ............. G02B 27/0176
12,244,977 B2 * 3/2025 Johnson ............... H04N 9/3185
12,332,445 B2 * 6/2025 Terrell, Jr. ........... H04N 13/344
12,345,896 B2 * 7/2025 Demaster-Smith ..... G06F 3/012
12,399,344 B2 * 8/2025 Dhanda ............. G02B 27/0172
2013/0108229 A1 5/2013 Starner et al.
2018/0098056 A1 * 4/2018 Bohn ................... G02B 27/017
2020/0018968 A1 1/2020 Edwin et al.
2023/0239443 A1 * 7/2023 Johnson ............... H04N 9/3185 348/336
2023/0239455 A1 * 7/2023 Churin ................. H04N 13/398 348/53
2023/0273433 A1 * 8/2023 Terrell, Jr. ........... H04N 13/344 359/630
2023/0273444 A1 * 8/2023 Demaster-Smith .......................... G02B 27/0093 349/11
2024/0361566 A1 * 10/2024 Dhanda .................. G02B 7/028

OTHER PUBLICATIONS

Combined Search and Examination Report under Sections 17 and 18(3) received for GB Application No. 2202394.9, dated Jul. 29, 2022. 6 pages.

* cited by examiner

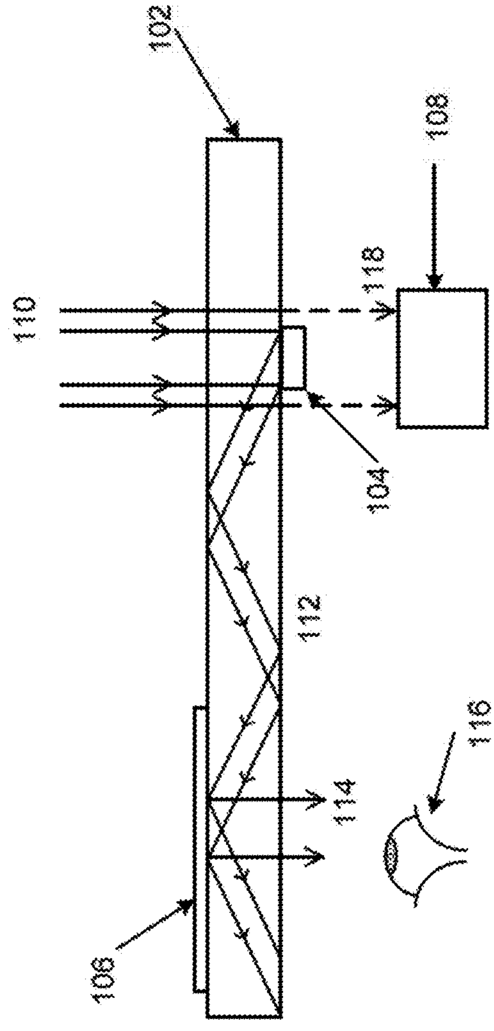
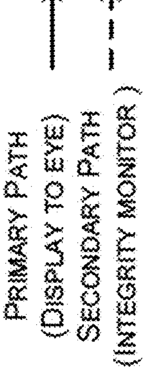
FIG. 1
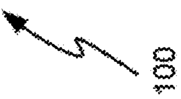

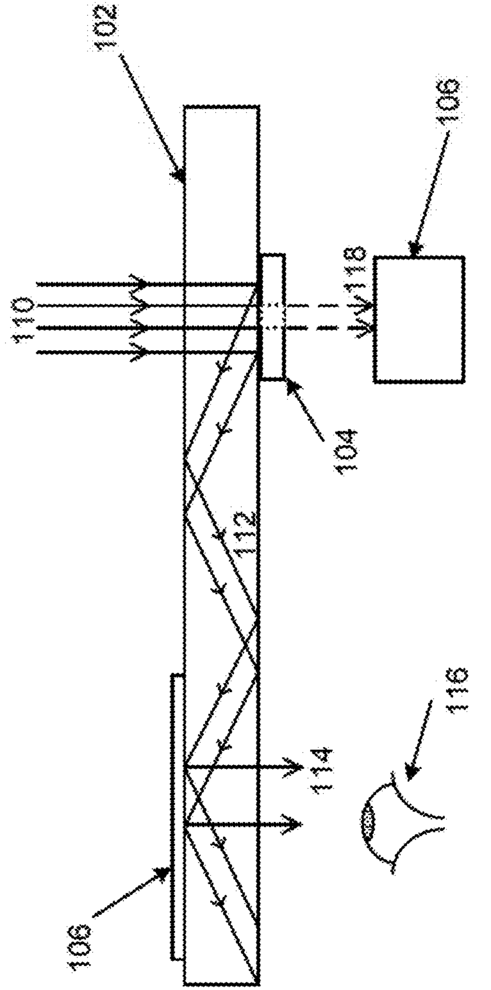
FIG. 2A
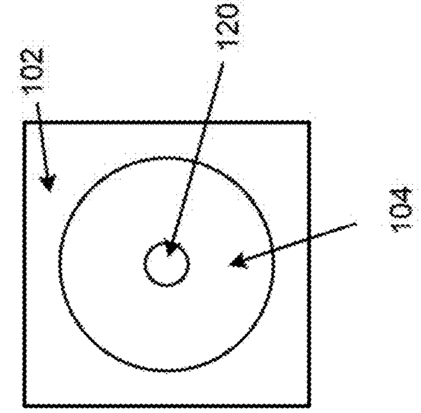
FIG. 2B
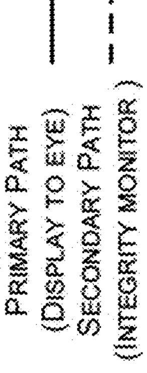

WAVEGUIDE DISPLAY SYSTEMS

The present invention relates to improvements in or relating to waveguide display systems, including but not limited to a display integrity scheme.

A display system may be required to operate with a high level of integrity. This is relevant in many situations, including for example for a flight critical display system, for use with avionics or for a targeting system used by the military. Display systems used to present safety critical information to a user are required to operate with a very high level of integrity. The display system must be able to detect when hazardously misleading information is presented to the user and act to mitigate the issue. With the use of commercial off the shelf (COTS) components within the system, a full access to the underlying processes and designs of the COTS items may not be possible which may lead to a more basic integrity monitoring system implemented within the display system giving inaccurate information.

Optical integrity monitoring systems previously implemented within various display systems can rely on a separate display path within the display projection optic. These optical integrity monitoring systems add mass and volume to the projection system. When used in display systems such as a head up display (HUD) this is not a major issue as size and weight are not key design parameters. However, in other systems where mass and volume are key design parameters, for example in a head worn display (HWD), this type of optical integrity monitoring system is inadequate.

Existing integrity monitoring schemes which allow for basic integrity monitoring of the display device within an optical system, can perform this task by checking whether rows or columns of the display are functioning as expected.

There is thus a need for a higher fidelity integrity monitoring system, capable of detecting complex display faults and scaled appropriately such that the integrity monitoring system is usable in smaller form factor applications, such as a head worn display system.

The invention provides a scheme which overcomes at least some of the disadvantages of present systems and for implementing a lightweight, low volume optical monitoring package. The invention allows for more detailed pixel level monitoring to take place.

Accordingly, one object of the present invention is to provide an improved integrity monitoring system.

SUMMARY

According to an aspect of the present invention there is provided a system for delivering an image to a user via a waveguide display system and for determining integrity of an image, the system comprising: a waveguide assembly including: an in coupling element configured to receive a collimated image from a imaging system and an out coupling element configured to direct the collimated image toward an eye of a user, wherein the waveguide is configured to direct at least a first portion of the collimated image from the in coupling element to the out coupling element to be directed to the user; wherein prior to the collimated image being directed towards the eye a second portion of the collimated image is configured to be directed towards an integrity monitoring module which determines at least one discrepancy between the collimated image and the image to thereby correct the first portion of the collimated image.

In the system, the first portion of the collimated image comes from a first source of a collimation optic and the second portion of the collimated image comes from a second source of the collimation optic.

In the system, the in coupling element is positioned so that the second portion of the collimated image does not interact with the in coupler and passes directly to the integrity monitoring module.

In the system, the in coupling element is shaped so that the second portion of the collimated image does not interact with the in coupler and passes directly to the integrity monitoring module.

In the system, the in coupling element includes a pin hole.

In the system, the in coupling element directs the first portion of the collimated image and the second portion of the collimated image along the waveguide to the out coupling element.

In the system, the in coupling element comprises a reflective element.

In the system, the reflective element is a semi-reflective element which is configured to split the collimated image into its first and second portions.

In the system, the out coupling element is configured to be graded in terms of efficiency along its length so as to allow the second portion of the collimated image to be directed to the integrity monitoring module.

In the system, the efficiency may be graded along the length of the out coupler by the variation of conformal coatings on the grating structure.

In the system, the out coupler is a reflective out coupler.

In the system, an efficiency of the reflective out coupler is varied by at least one of: use of a varying efficiency reflective coatings on a reflective facet of the reflective out coupler, or by a change in structure size or spacing.

In the system, the out coupling element comprises one of a diffractive element, a reflective element or a combination of a diffractive and reflective elements.

In the system, a correction system is configured to implement a correction to the image such that a discrepancy between the collimated image and the image is reduced.

In the system, the discrepancy is reduced based on comparison with a threshold discrepancy In the system, the integrity monitoring module comprises an optical arrangement configured to direct the second portion of the collimated image to a sensor.

In the system, the integrity monitoring module comprises a lens element and a sensor to provide the second portion of the collimated image to a monitoring loop in which discrepancies between the collimated image and image are determined.

In the system, the integrity monitoring module is further configured to analyse the second portion of the collimated image to determine the at least one discrepancy between the collimated image and the image and to send to the system information related to at least one of the nature of the at least one discrepancy between the collimated image and the image and one or more corrections to mitigate or overcome the at least one discrepancy between the collimated image and the image.

The system, for use in a binocular arrangement comprising one out coupling element for each eye.

The system, for use in the binocular arrangement and further comprising one waveguide and one in coupling element for each eye, wherein the in coupling elements for each eye directs a left and right second portion of the collimating image to the integrity monitoring module.

The system, to provide optical monitoring of a left eye display and a right eye display separately using time multiplexing to switch the images.

A heads up display including the system.

A head worn display system including the system.

A According to a further aspect of the present invention there is provided an integrity monitoring module for use in the system of any preceding claim, the integrity monitoring module comprising: optics configured to receive the second portion of the collimated image; direct the second portion of the collimated image towards one or more sensors configures to determine at least one discrepancy between the collimated image and the image on the second portion of the collimated image; generate an output indicative of the at least one discrepancy between the collimated image and the image and a correction to the or each at least one discrepancy between the collimated image and the image.

According to a further aspect of the present invention there is provided a method for delivering an image to a user via a waveguide display system and for determining integrity of an image, the method comprising: receiving via an in coupler a collimated image from a imaging system; splitting the collimated image into first and second portions; directing via an out coupling element the first portion of the collimated image towards an eye of a user, directing the second portion of the collimated image towards an integrity monitoring module which determines at least one discrepancy between the collimated image and the image in the collimated image to correct the first portion of the collimated image.

DESCRIPTION OF THE DRAWINGS

FIG. 1 is a schematic diagram of a waveguide and pupil expander, according to an aspect of the present invention.

FIGS. 2*a* and 2*b* are schematic diagrams of a waveguide and pupil expander, according to an aspect of the present invention.

DESCRIPTION OF THE INVENTION

Figure 3:
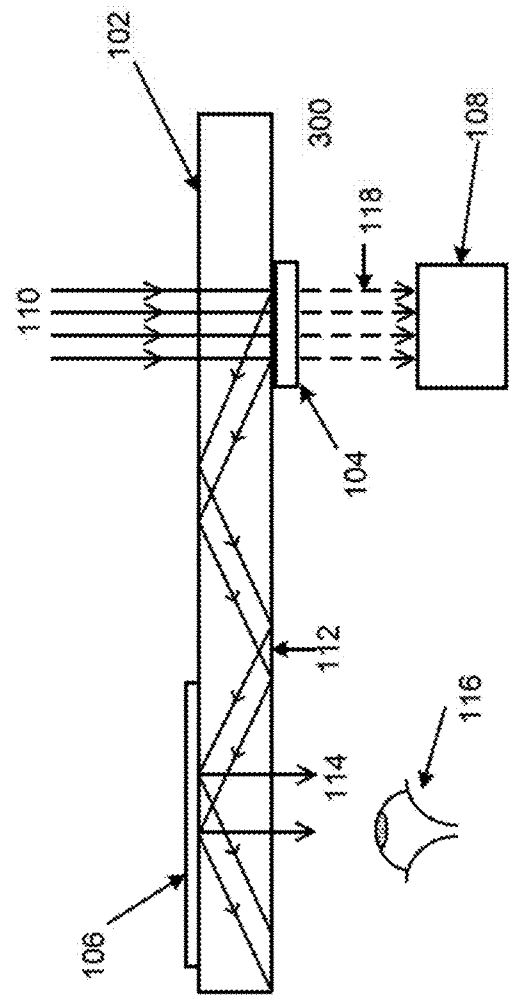
FIG. 3 is a schematic diagram of a waveguide and pupil expander, according to an aspect of the present invention.
Figure 3:
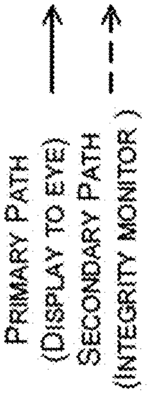

In general, the present invention relates to an optical integrity monitoring scheme for use with waveguide-based displays which provides a scheme for checking the optical output of the display system and bypassing any issues with the use of existing components within the display path which cannot be interrogated or modified. A number of examples are presented, which make use of light which bypasses the waveguide in coupling element. This image bearing light is then collected by an optical sensing element which provides a way to analyse the display content as part of the integrity monitoring system.

Integrity monitoring systems have been implemented in Avionic display or imaging systems which are used as primary flight instruments for some time. In some cases, the display's integrity is monitored solely in the electronic side of the display path with no optical inspection of the display. This is possible where the display path electronics are fully understood from the generation of the image content through to the construction of the image on the display device. This typically requires a full understanding of the design and function of each component in the display path. This is not always possible, especially with the use of complex COTS components, such as display chipsets. Additionally, these methods do not account for any physical changes within the optical system which might affect the display image, for example optical lenses moving causing the display image to become defocussed. In these scenarios optical monitoring of the display provides a method of closing the display path integrity loop. The integrity monitoring system then feeds back data which can be used to either correct discrepancies between the commanded or original image from a scene and the image displayed to the user, or inform the user of a failure within the device and removing the risk of potentially misleading information being displayed to the user. The original image may comprise a collimated image which is received from a source, such as a display, camera or any other imaging system. This will be described in greater detail below.

In the figures described below a solid light ray (primary path) represents the part of light directed towards a user and the dotted line (secondary path) represents the part of light directed to an integrity monitoring module.

Referring to FIG. 1, an optical system 100 (also referred to as a waveguide assembly) is shown. The optical system includes a pupil expansion device including a waveguide substrate 102, an in coupling element 104 and an out coupling element 106. The waveguide substrate may also include one or more additional optical elements on or within the substrate for performing additional optical functions. In addition, the system includes an optical integrity monitoring module 108. Light 110 is injected into the waveguide substrate towards the in coupling element. A portion of the light 112 is directed towards the out coupling element along the length of the waveguide substrate 102 under total internal reflection. An image 114 is then output via the out coupling element towards an eye 116 of a user. The out coupling element may comprise a diffractive structure, a reflective structure, a combination of optical structures or any other type of out coupling device which suits the requirements.

The pupil of light 110 injected into the waveguide assembly is larger than the in coupling element 104. Typically, the pupil of light is either matched or is smaller than the in coupling element to maximise in coupling efficiency. The light which is not incident on the in coupling element passes through the waveguide assembly and is collected by the integrity monitoring module. The oversized pupil of light does not need to be centred on the in coupling element, instead it could be off centre to achieve the same effect.

Another portion of light 118 is directed via the in coupling element to the integrity monitoring module 108 where it is analysed to determine optical discrepancies between an original and actual image caused by the optical system in question. In this aspect, the pupil of light 110 is oversized with respect to the in coupling element 104. The resultant effect it that a portion of the incoming light 110 now referred to as 118 does not interact with the in coupling element 104 and passes through the waveguide. This light 118 is then collected by the integrity monitoring module 108. Where the pupil of light 110 injected into the waveguide assembly is larger than the in coupling element 104. Typically, the pupil of light is either matched or is smaller than the in coupling element to maximise in coupling efficiency. The light 118 which is not incident on the in coupling element passes through the waveguide assembly and is collected by the integrity monitoring module. The oversized pupil of light does not need to be centred on the in coupling element, instead it could be off centre to achieve the same effect.

The integrity monitoring module analyses the light 118 and determines any discrepancies between the original collimated image and the received image. These discrepancies are then sent to the display control system to provide corrective action to mitigate the impact of the discrepancy to the user. The manner in which the integrity module analyses and determines discrepancies is discussed further below with reference to FIGS. 10 and 11.

The in coupling element could be a diffractive element such as a grating structure, or a reflective optical structure. The in coupling element redirects a majority of the light down the length of the waveguide substrate and only a certain percentage of the light passes through the in coupler exiting the waveguide assembly towards the optical integrity monitoring module. The light does not pass though the in coupler and exit the waveguide towards the optical integrity monitor, but simply misses the in coupling element altogether. Ideally light directed to the out coupling element on the primary path is be maximised to provide a high efficiency level. Accordingly, the amount of light directed towards the optical integrity monitor is low, for example in a range of >0% to 10% of the incident light 110.

Figure 7:
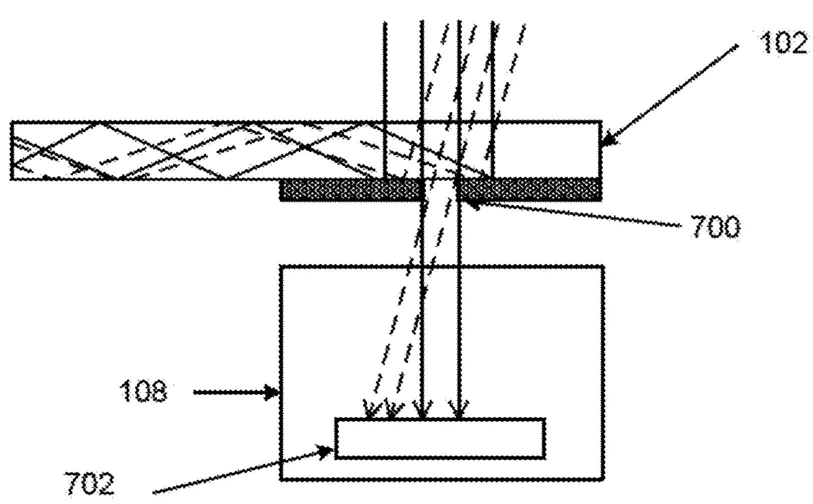
FIG. 7 is a schematic diagram of an integrity monitoring setup suitable for the arrangement shown in FIG. 2, according to an aspect of the present invention.

Referring now to FIG. 2*a*, which shows a similar arrangement to the FIG. 1 scheme. In this aspect of the invention, the partial transmission of the light injected through the in coupling element is facilitated by a hole or gap 120 in the in coupling element. This is shown in greater detail in FIG. 2*b* as a small circular hole 120 in the centre of the in coupling element 104. It is noted that the shape, size, and position could vary depending on the implementation. The size of the hole will control the amount of light transmitted through the in coupling element. This method of transmitting the light is adapted to the integrity monitoring module set up as shown in FIG. 7 which is described in greater detail below.

FIG. 3 shows an arrangement Splitting of the light into the two portions 112 and 118 could be implemented by designing the in coupler to sacrifice some efficiency of the light coupling mechanism. For example, the in coupler may include a semi-reflective element having a coating layer used to decrease its coupling efficiency to allow an amount of non-coupled light to transmit toward the integrity monitoring module, much like a two way mirror. In an alternative example the in coupler may include a diffraction grating configured to split the light into the two portions across two or more diffractive orders. In other schemes there may be different in coupling elements including a combination of reflection and diffraction and any other appropriate optical structures which is configured to split the light into the required portions.

Figure 4:
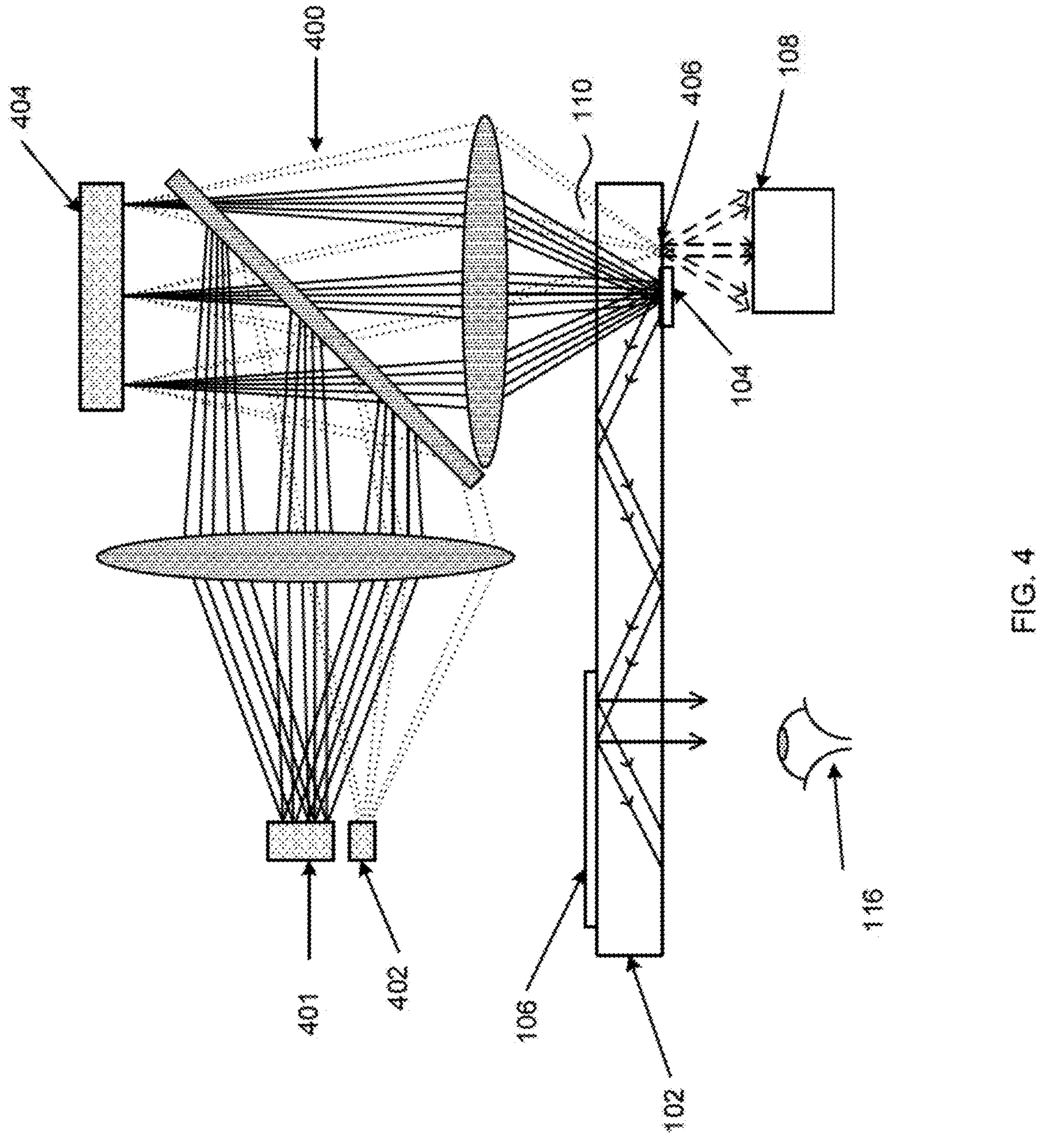
FIG. 4 is a schematic diagram of a waveguide and pupil expander, according to an aspect of the present invention.

FIG. 4 shows an arrangement 400 where the light is generated by a primary light source 401 and a secondary light source 402. The light which is collected by the integrity monitoring module is generated by the secondary light source. In this optical arrangement the light sources are used in conjunction with a reflective display device 404. The light sources are imaged into the pupil of the light 110 injected into the waveguide substrate. As a result, the offset secondary light source 402 results in an offset pupil 406 filled only with the light wavelengths generated by the secondary light source. The offset pupil is then not incident on the in coupling element and passes through the waveguide assembly to be captured by the integrity monitoring module.

This arrangement may include a non-visible wavelength spectrum for at least the secondary light source 402 to be used for the integrity monitoring module. This wavelength spectrum for example could be in the infrared range. This allows for specific images to be constructed on the display device which when paired with secondary light source illumination will not be visible by the user, thereby ensuring the user is not distracted from the primary image. In general reference to light may include any appropriate wavelength range as is relevant to the desired use.

Figure 5:
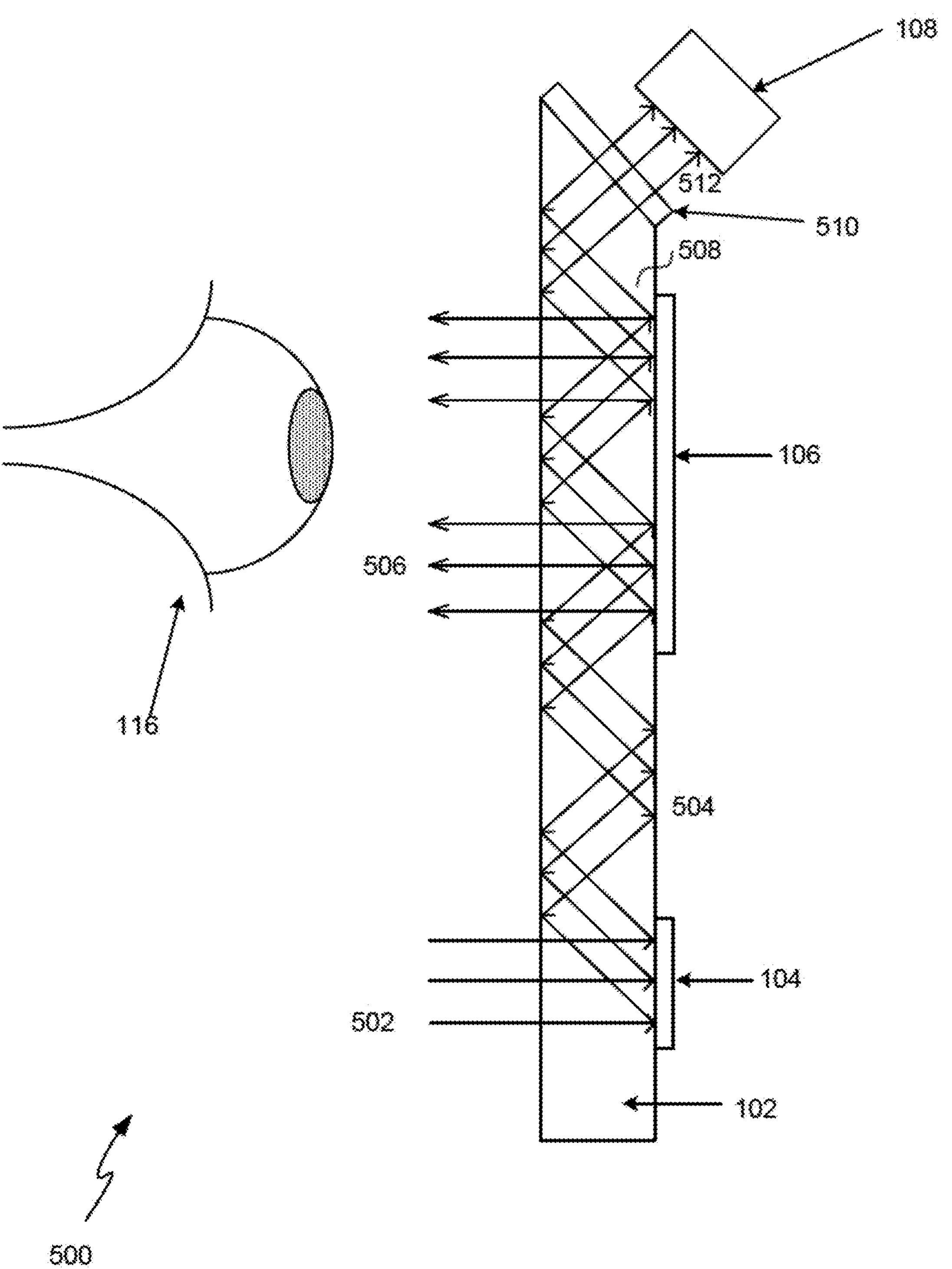
FIG. 5 is a schematic diagram of an alternative waveguide and pupil expander, according to an aspect of the present invention.

FIG. 5 shows an alternative configuration 500, where all the light 502 injected into the waveguide substrate 102 is turned by the in coupling element 104 so that all of the light 504 passes though the waveguide substrate towards the out coupling element 106. In the waveguide pupil expander the out coupling element is graded in terms of efficiency along its length to provide a uniform output. In this configuration the out coupling element is made to be less than 100% efficient as the intended use of the waveguide is as a see-through display. As a result, the light is split at the out coupler into a first portion 506 which is directed towards the eye 116 and a second portion 508. The second portion 508 propagates past the out coupling element, this light 508 is then coupled out of the waveguide by out coupling element 510. The out coupling element may include a prismatic feature which allows the light 512 to refract out of the waveguide assembly and be collected by the integrity monitoring module 108.

In an aspect of the invention the out coupling element may include a diffractive out coupling element the efficiency may be graded along its length by the variation of conformal coatings on the grating structure. In the case of a reflective out coupler, the efficiency may be varied by the use of varying efficiency reflective coatings on the reflective facets, or by a change in structure size and/or spacing.

In this scheme a limited Field of View (FOV) will be collected by the integrity monitoring module based on the geometry of the waveguide as the FOV diverges within the waveguide. Additionally, some chromatic aberration may occur if the in coupling element is of a diffractive nature. As a result, this arrangement is more suited to a narrow spectral range for example a laser based display system. The chromatic aberration may be corrected by the addition of a diffractive optical element on the angled output face. The period of the diffractive structure is then designed to counteract the chromatic spread induced by the prismatic feature and the in coupling element.

Figure 6:
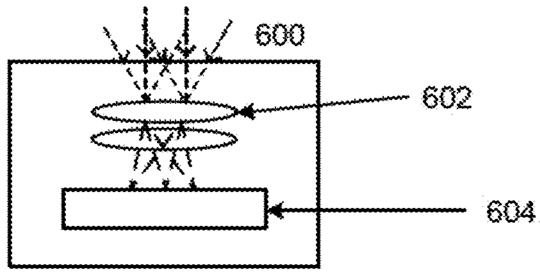
FIG. 6 is a schematic diagram of an optical arrangement for an integrity monitoring optic package, according to an aspect of the present invention.

FIG. 6 shows an example of an optical arrangement of the integrity monitoring module 108. There are several options for the integrity monitoring module. In one option the monitor could be a simple camera system, where the light 600 captured is focused by a lens element 602 onto a sensor 604 to provide an image of the displayed content. It is possible to provide a greater complexity of monitoring from pixel level integrity monitoring to a simpler monitoring of specific displayed elements where the resolution of the camera is matched to or greater than that of the display system. The sensing element could also be of a more basic nature and could range from a simple single photodiode capable of measuring light levels to multiple light detection sites providing resolution across the displayed image. The sensing element could be colour capable. It will be appreciated that many options are possible.

FIG. 7 shows an integrity monitoring module suitable for the arrangement shown in FIG. 2. In FIG. 7 solid lines are showing 1 field angle of light (or portion of the image), and dashed lines are showing a second field angle of light (portion of the image). The arrangement makes use of a hole 700 in the in coupling element 104, which acts in a similar manner to a pin hole camera. A benefit of this arrangement is there is no need for a lens element to focus the light onto the sensor 702. This will reduce the mass of the integrity monitoring module 108, which is a key factor in HWDs. The size of the pin hole will dictate the resolution achieved by the system. The pin hole camera arrangement is also suitable for use in the arrangements shown in FIG. 1, FIG. 4, and FIG. 5, however an additional separate pin hole aperture is required to compensate for the transmitted pupil being too large.

Figure 8:
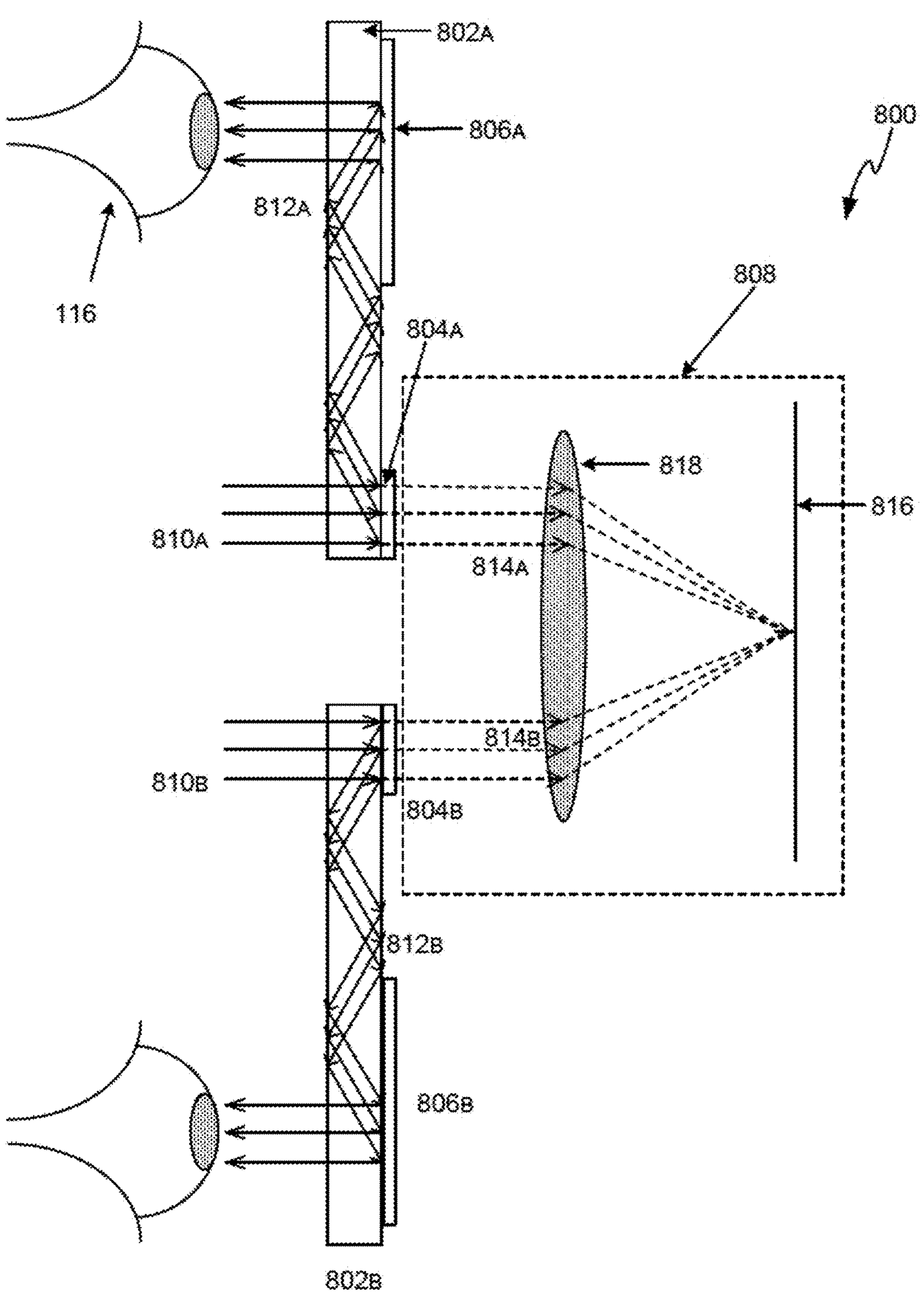
FIG. 8 is a schematic diagram of an arrangement for a binocular display system utilising a single integrity monitoring module, according to an aspect of the present invention.
Figure 9:
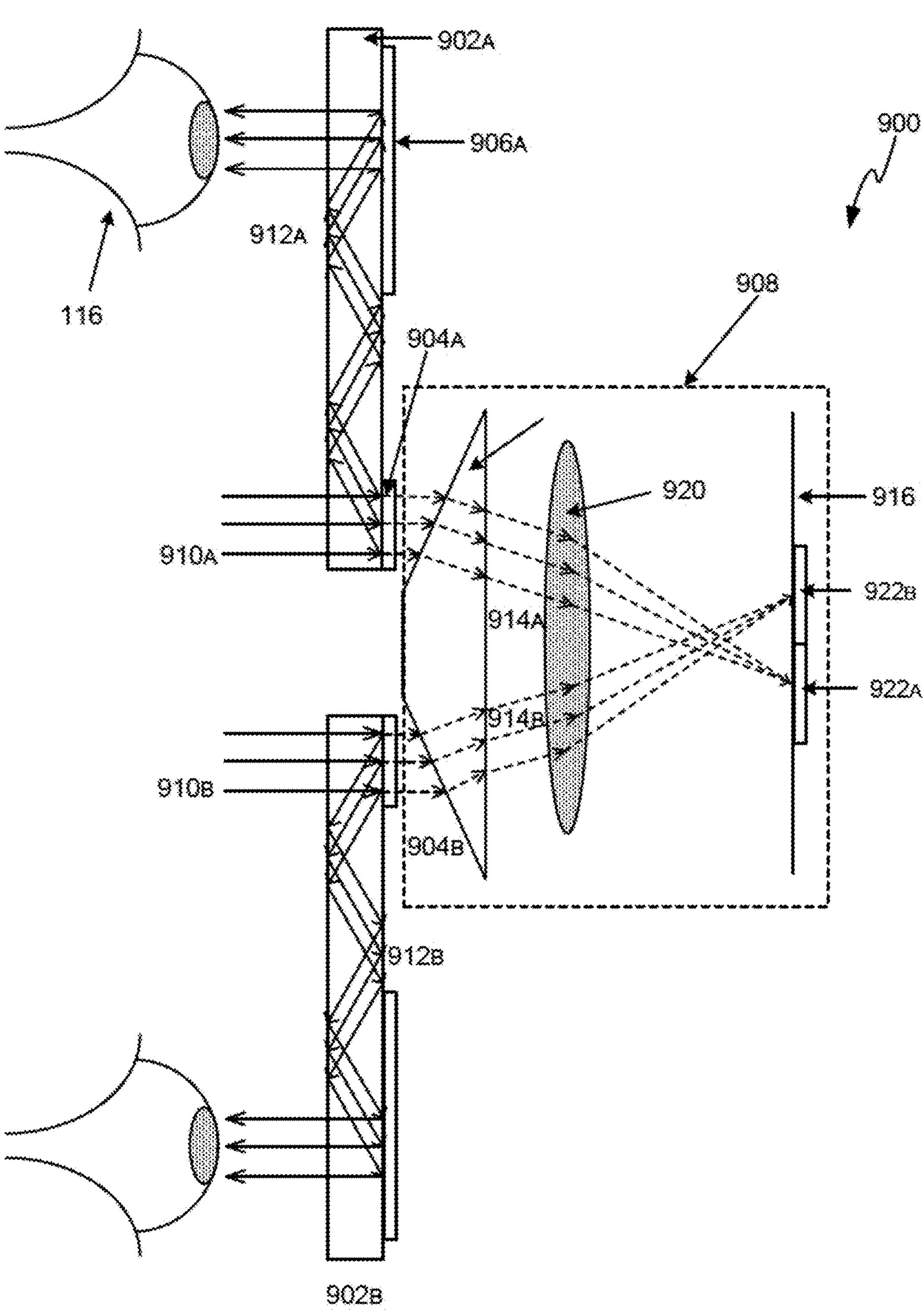
FIG. 9 is a schematic diagram of an arrangement for a further binocular display system utilising a single integrity monitoring module, according to an aspect of the present invention.

FIG. 8 and FIG. 9 show an arrangement for a binocular display system utilising a single integrity monitoring module.

The arrangement 800 in FIG. 8 comprises a waveguide and pupil expander 802*a* and 802*b* for each eye of the user. Each waveguide and pupil expander includes an in coupler 804*a* and 804*b* and respective out couplers 806*a* and 806*b*. The arrangement also includes an integrity monitoring module 808. Each in coupler receives light 810*a* and 810*b* and splits each into two portions of light 812*a*, 812*b* and 814*a*, 814*b*. The light 814*a* and 814*b* which passes through the waveguide assembly and is collected by the integrity monitoring module from both waveguide assemblies 802*a* and 802*b* is directed to the same position on a sensor 816 via lens or lenses 818.

In order to provide optical monitoring of the left eye display and right eye display separately the display system may use time multiplexing to split the images or to switch between the left and right displays. For example, each image is displayed at one eye and then the other. In the time the image is being displayed at one eye the other may be blanked In synchronisation with this display drive arrangement the sensor is configured to capture a frame at the same time as the image is displayed to the left eye, and subsequently timed to capture the separate image driven to the right eye. In order to determine the optical discrepancies between the original collimated image and actual image displayed to each eye and caused in the system would thus require a complex analysis.

Another arrangement 900 is shown in FIG. 9 in which both displays can be driven at the same time. The light 910*a* and 910*b* passes through both waveguide assemblies 902*a* and 902*b*, but prior to being focused onto the sensor 916, the light passes through a beam deviator 918 and a lens or lenses 920. This beam deviator acts like a prism, imparting an angular deviation to the light path. If the angle and refractive index of the material of the beam deviator are selected correctly, it is possible to separate the field of view from each of the waveguides so that they are separated physically on the sensor. This results in two images 922*a* and 922*b* being received by the sensor side by side, allowing for the analysis of both images simultaneously.

In illustrated example apart from that shown in FIG. 4, there is no need to change a display generating optical projector. Existing architectures make use of a separate monitoring path built into the projection optic. This requires the inclusion of beam splitters or cold mirrors to separate the display and monitoring path. This adds additional mass and volume to the projection optic. In HWDs such an increase in volume or mass is undesirable.

The invention could be provided as an add-on component in terms of the optical arrangement of a display system. This would allow the same optical display system to be used with or without the monitor, allowing for a modular approach to products. If integrity monitoring is required, the system can be added with little to no modification to the optical arrangement.

In all schemes the light extracted for integrity monitoring is analysed to determine if there are any discrepancies between the original collimated image and actual image introduced by the display system. Information relating to any such discrepancies between collimated image and actual image is fed back to a correction system (not shown) to apply a correction to the light arriving at the eye of the user.

The integrity monitoring module is able to detect and generate corrections for all optical discrepancies between the original and actual image. There are several possible uses for the integrity monitoring system. In a basic usage scenario, the integrity monitoring system looks for discrepancies between the collimated image and the displayed image, any discrepancy can then be compared to a pre-set threshold value for that discrepancy type. If the discrepancy exceeds the threshold value, then the user is made aware of a fault within the system via a correction or feedback system forming part of the overall system.

In another scenario it may be the case that the fault is a frozen display i.e. the display is not being updated with the latest image. In this case the user may be made aware of the issue by the display channel being switched off. This would prevent the user being exposed to misleading information. In more complex systems it could be that a portion or section of the image is incorrect, due to "stuck pixels" in the display generator. In this case it may be possible to reposition information which would be displayed over those pixels to another position on the display, therefore still providing the correct information to the user albeit in a different location.

The integrity monitoring system may be capable of monitoring the following discrepancies in the display path:

- Magnification error resulting in incorrect image scaling.
- Image shift causing the image to not align correctly with the outside world.
- Image rotation.
- Colour channel failure, causing the loss of some commanded colours and the incorrect rendering of mixed colours.
- Luminance discrepancies, the image being displayed to the eye not corresponding to the set/commanded brightness level.
- Display failure, no image being displayed to the user.

In some cases, a correction may be able to be applied to the driven image to mitigate the detected failure, such as a luminance adjustment, an image shift/rotation. However, in some other cases such as colour channel failure, the user could be made aware of the reduced colour palette being made available. The information may still be displayed to the user, but perhaps in monochrome, removing the advantage of colour coded symbols etc. but still allowing the user to see an accurate representation of the image.

Figure 10:
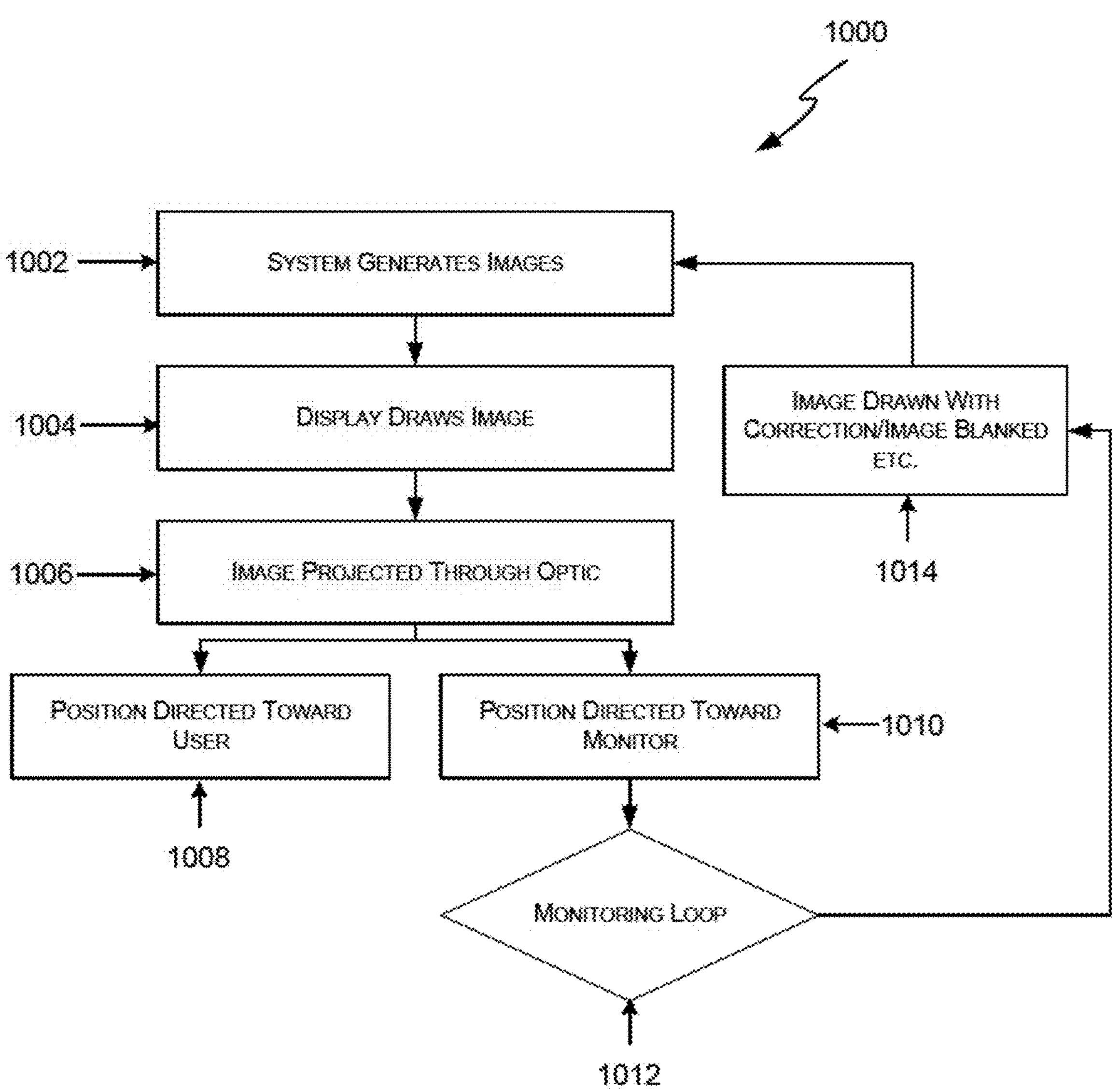
FIG. 10 is a flow diagram for using the single integrity monitoring module, according to an aspect of the present invention.

FIG. 10 shows and example of a generic monitoring process 1000. An image is generated, 1002, by the system or any appropriate image generating means. The image is created or drawn 1004, so that is can be displayed. The created image is projected 1006, though the relevant optical system, in this case system 100. A portion of light is directed towards a user 1008 and a portion towards the monitor including the integrity monitoring module 1010. The portion directed towards the monitor passes through a monitoring loop 1012 in which discrepancies between the original collimated image and actual image are determined or identified. The image is then redrawn, recreated, corrected, blanked or otherwise altered and then returned to step 1002 in which the image is generated.

Figure 11:
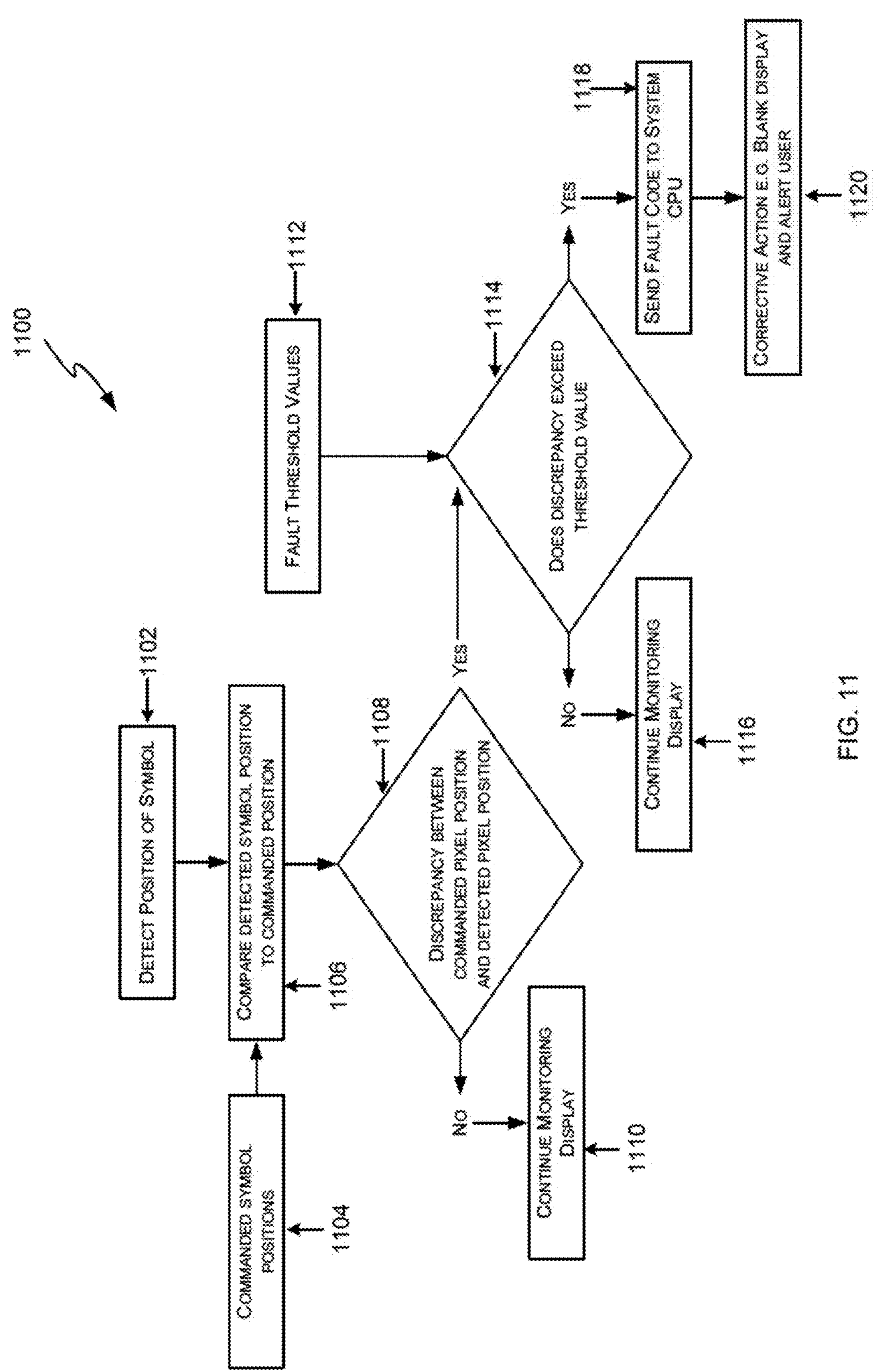
FIG. 11 is a flow diagram for using the single integrity monitoring module for a particular correction, according to an aspect of the present invention.

FIG. 11 shows the process for one specific discrepancy by way of example. This this case the example 1100 is an image shift fault detection. A position of a symbol in the image is detected 1102. The symbol position in the commanded or original image is input 1104. The detected image and the original image are compared 1106. A determination is made as to whether there is a discrepancy between the images 1108. If no, the process continues to monitor the display 1110 and no additional action is taken. If yes, the process seeks a relevant threshold value 1112 which is then compared with the discrepancy, 1114. If the discrepancy does not exceed the threshold the process continues to monitor the display 1116 and no additional action is taken. If the discrepancy does exceed the threshold the process sends a fault code to the system 1118. The system Control Processing Unit (CPU) takes corrective 1120 action such as for example blanking the display or otherwise alerting the user.

The invention is intended to be used in waveguide based display systems, however its use is not limited to HWDs and could be implemented within HUD systems which also utilise waveguide technology. Whilst the invention provides the ability to monitor the integrity of the images displayed to the user, it could also be implemented in a simpler form to monitor display brightness, and colour. In these examples the sensor in the integrity module would be appropriate to the intended type of monitoring.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A system for delivering an image to a user via a waveguide display system and for determining integrity of the image, the system comprising:

a waveguide assembly including an in coupling element configured to receive a collimated image from an imaging system, and an out coupling element configured to direct the collimated image toward an eye of the user, wherein the waveguide assembly is configured to direct at least a first portion of the collimated image from the in coupling element to the out coupling element to be directed to the user, wherein prior to the collimated image being directed towards the eye, a second portion of the collimated image is directed towards an integrity monitoring module which determines at least one discrepancy between the collimated image and the image to thereby correct the first portion of the collimated image, and wherein the in coupling element is configured such that the second portion of the collimated image does not interact with the in coupling element and through to the integrity monitoring module.

2. The system of claim 1, wherein the first portion of the collimated image comes from a first source of a collimation optic, and the second portion of the collimated image comes from a second source of the collimation optic.

3. The system of claim 1, wherein the in coupling element is positioned so that the second portion of the collimated image does not interact with the in coupling element and passes directly to the integrity monitoring module.

4. The system of claim 1, wherein the in coupling element is shaped so that the second portion of the collimated image does not interact with the in coupling element and passes directly to the integrity monitoring module.

5. The system of claim 1, wherein the in coupling element includes a pin hole.

6. The system of claim 1, wherein the in coupling element comprises a reflective element.

7. The system of claim 6, wherein the reflective element is a semi-reflective element which is configured to split the collimated image into its first and second portions.

8. The system of claim 7, wherein the out coupling element is a reflective out coupling element.

9. The system of claim 1, wherein the out coupling element comprises one of a diffractive element, a reflective element, or a combination of a diffractive and reflective elements.

10. The system of claim 1, further comprising a correction system configured to implement a correction to the image such that the at least one discrepancy between the collimated image and the image is reduced.

11. The system of claim 10, wherein the at least one discrepancy is reduced based on comparison with a threshold discrepancy.

12. The system of claim 1, further comprising the integrity monitoring module, wherein the integrity monitoring module comprises a lens element and a sensor to provide the second portion of the collimated image to a monitoring loop in which the at least one discrepancy between the collimated image and image is determined.

13. The system of claim 12, wherein the integrity monitoring module is further configured to analyse the second portion of the collimated image to determine the at least one discrepancy between the collimated image and the image and to send to the system information related to the nature of the at least one discrepancy between the collimated image and the image and/or one or more corrections to mitigate or overcome the at least one discrepancy between the collimated image and the image.

14. The system of claim 1 for use in a binocular arrangement, wherein the eye of the user is one of first and second eyes of the user, and wherein the system includes one out coupling element for each of the first eye and the second eye.

15. The system of claim 1, wherein the system is part of a head worn display system or a head up display system.

16. The system of claim 1, further comprising the integrity monitoring module, the integrity monitoring module comprising:

optics configured to receive the second portion of the collimated image and direct the second portion of the collimated image towards one or more sensors;

wherein the integrity monitoring module is configured to determine the at least one discrepancy between the collimated image and the image on the second portion of the collimated image, and generate an output indicative of the at least one discrepancy between the collimated image and the image and a correction to the or each at least one discrepancy between the collimated image and the image.

17. The system of claim 1, further comprising the integrity monitoring module, wherein the integrity monitoring module comprises an optical arrangement configured to direct the second portion of the collimated image to a sensor.

18. A binocular arrangement for use with the system of claim 1 and comprising a first one of the waveguide assembly and a second one of the waveguide assembly, wherein the first and second waveguide assemblies are for first and second eyes, respectively, of the user, wherein the respective in coupling element of the first waveguide assembly directs a first second portion of the collimated image to the integrity monitoring module, and the respective in coupling element of the second waveguide assembly directs a second second portion of the collimated image to the integrity monitoring module.

19. The binocular arrangement of claim 18, wherein one of the first and second eyes is a left eye of the user and the other is a right eye of the user, and the binocular arrangement is configured to provide optical monitoring of a left eye display and a right eye display separately using time multiplexing to switch the corresponding images.

20. A method for delivering an image to a user via a waveguide display system and for determining integrity of the image, the method comprising:

receiving via an in coupling element a collimated image from an imaging system;

splitting the collimated image into first and second portions, such that the second portion of the collimated image does not interact with the in coupling element;

directing via an out coupling element the first portion of the collimated image towards an eye of the user; and directing the second portion of the collimated image towards an integrity monitoring module which determines at least one discrepancy between the collimated image and the image in the collimated image to correct the first portion of the collimated image.

* * * * *